Patented Dec. 9, 1924.

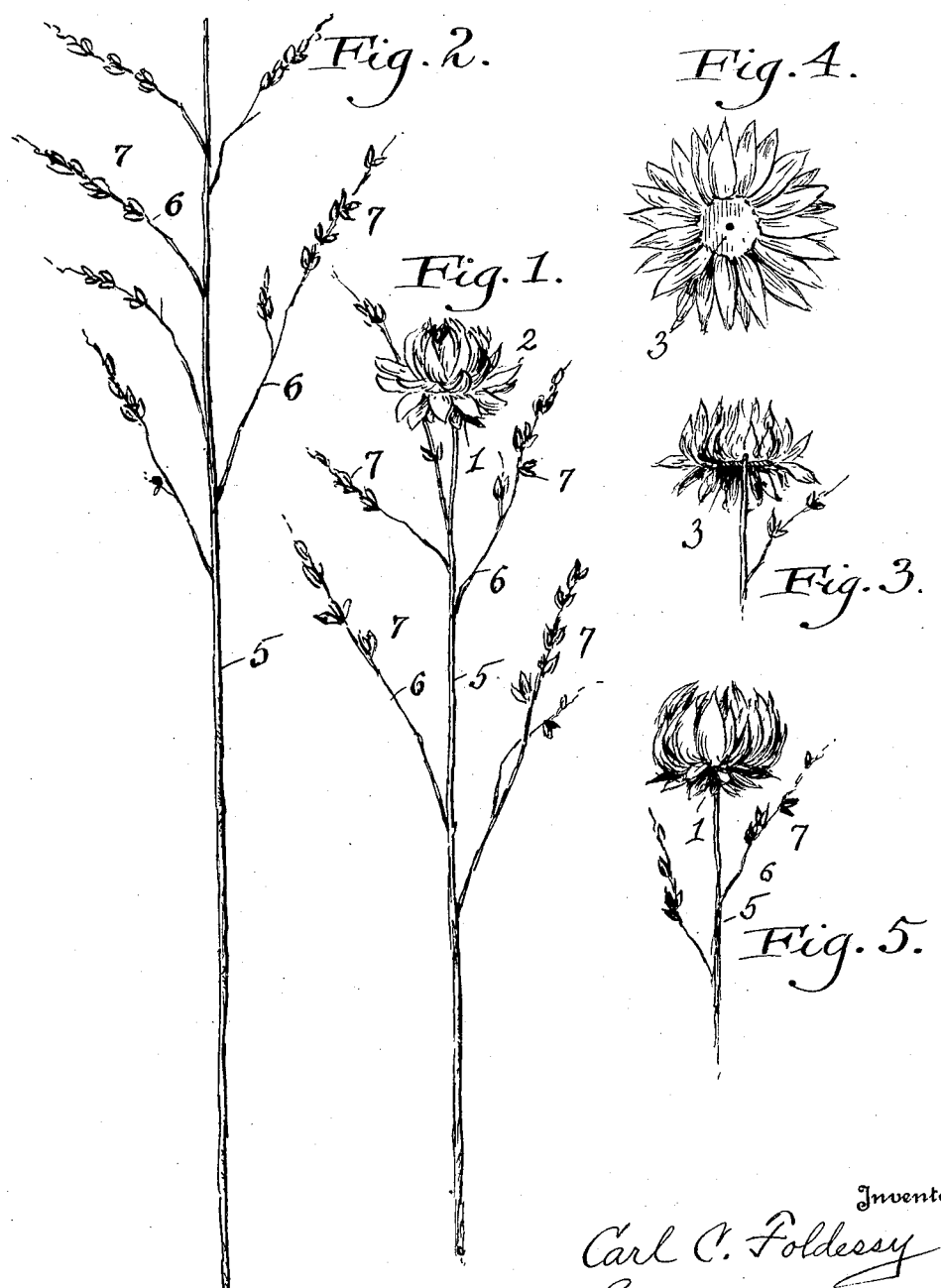

1,518,909

UNITED STATES PATENT OFFICE.

CARL C. FOLDESSY, OF WARRENSVILLE, OHIO.

MANUFACTURED FLOWER.

Application filed November 15, 1923. Serial No. 674,819.

*To all whom it may concern:*

Be it known that I, CARL C. FOLDESSY, a citizen of the United States, residing at Warrensville, in the county of Cuyahoga and State of Ohio, have invented a certain new and useful Improvement in Manufactured Flowers, of which the following is a full, clear, and exact description.

This invention relates to a manufactured flower consisting of the dried bloom of one of the so-called everlasting flowers and a tough flexible stem which is provided with foliage, the stem and foliage preferably being a sprig of dried broom corn which has been cut while still quite green and before the seed pods have ripened.

Certain species of flowers are commonly called everlasting flowers because of the fact that the bloom retains its shape and color when dried and can be kept indefinitely. Of these flowers those best known and commonly used in making dried flower bouquets are varieties of the helichrysum and of acroclinium. While the blooms of these plants can be satisfactorily preserved by the drying process, the stems when dried are exceedingly brittle and the foliage is entirely destroyed in the drying process. Since the original stems are unsuitable for permanent bouquets, it has heretofore been customary to affix the dried flowers to stems made of wire. It is the object of the present invention to provide manufactured flowers with natural dried blooms attached to natural dried sprigs of plants which are tough and flexible when dried and which have a foliage which is not destroyed by the drying process.

Reference should be had to the accompanying drawings forming a part of this specification in which Fig. 1 shows a manufactured flower embodying the invention; Fig. 2 shows a broom corn sprig with the branches and seed pods which form the foliage of the manufactured flower; Fig. 3 is a central section through one of the everlasting blooms; Fig. 4 is a bottom plan view of one of the blooms showing the central woodlike calyx to which the stem is attached; Fig. 5 is a view of the flower which has been soaked and softened to enable it to be attached to the stem.

Referring to the accompanying drawings, the everlasting flower 1 has petals 2 radiating from the central calyx 3 which, when the flower is dried, is in the form of a hard woodlike button.

The broom corn sprig shown in Figs. 1 and 2 consists of a stem 5 and the branches 6 toward the upper end thereof which carry the seed pods 7. This broom corn sprig is preferably artificially colored to resemble natural foliage. This may be done by first dipping the dried sprig in a liquid glue, allowing the glue coating to dry and then dipping the sprig in a green bronze paint.

To attach the flower to the broom corn stem the dried flower is soaked for about one-half hour in water. This causes the petals to fold up into a ball as shown in Fig. 5 and thoroughly softens the hard calyx 3. The calyx is then pierced with a suitable sharp instrument, such as a needle to provide a perforation through it into which the upper end of the broom corn stem may be inserted. When the flower again becomes dry the calyx hardens and shrinks tightly upon the stem so that the flower is firmly held thereon. The glue on the stem also assists in retaining the bloom on the stem but the glue is not essential as it has been found that the blooms adhere very firmly to a stem which has not been coated with glue.

The broom corn sprig is very tough and flexible, the seed pods forming the foliage do not readily become detached, and the foliage of the broom corn adds greatly to the beauty of a bouquet made up of flowers manufactured as above described.

Having described my invention, I claim—

A manufactured flower including a broom corn sprig dried in a green condition comprising a stem with branches extending from the upper portion thereof and pods on the branches, and a bloom of a species of an everlasting flower secured upon the upper end of the stem.

In testimony whereof, I hereunto affix my signature.

CARL C. FOLDESSY.